United States Patent [19]
Bledsoe, Jr.

[11] 3,908,947
[45] Sept. 30, 1975

[54] STANDARD FOR A SIGN

[75] Inventor: William E. Bledsoe, Jr., Milwaukee, Wis.

[73] Assignee: Bledsoe Corporation, Menomonee Falls, Wis.

[22] Filed: Sept. 20, 1974

[21] Appl. No.: 507,631

Related U.S. Application Data

[63] Continuation-in-part of Ser. No. 351,899, April 17, 1973, abandoned.

[52] U.S. Cl. ............................ 248/188.7; 40/125 H
[51] Int. Cl.² ........................................ A01G 27/00
[58] Field of Search ................... 248/188.7, 48, 159; 40/125 H, 44

[56] References Cited
UNITED STATES PATENTS

| 184,361 | 2/1959 | Lindenmeyer | 248/188.7 X |
| 526,834 | 10/1894 | Hetterschied | 248/188.7 |
| 1,298,380 | 3/1919 | Owen | 248/48 |
| 2,111,244 | 3/1938 | Hueglin | 248/188.7 X |
| 2,295,281 | 9/1942 | Grunwald | 248/188.7 |
| 2,882,629 | 4/1959 | Moebius | 40/125 H X |
| 3,223,368 | 12/1965 | Pollock | 248/188.7 X |
| 3,469,342 | 9/1969 | Morris | 248/44 X |
| 3,477,671 | 11/1969 | Goodridge | 248/188.7 X |

FOREIGN PATENTS OR APPLICATIONS

| 1,094,825 | 6/1959 | France | 248/188.7 |
| 981,384 | 1/1965 | United Kingdom | 248/159 |
| 987,918 | 3/1965 | United Kingdom | 248/159 |
| 75,632 | 9/1949 | Norway | 248/188.7 |

*Primary Examiner*—J. Franklin Foss
*Attorney, Agent, or Firm*—Henry C. Fuller

[57] ABSTRACT

A standard for a sign or a point of purchase display includes a plastic base which can be molded in one piece or formed from three parts. Each part includes a hub portion and a shoulder portion with the hub portions provided with longitudinal ribs which snugly receive and maintain erect a tubular post which holds the parts of the base together. The post is supported on the shoulder and the base is supported by three legs projecting radially from the shoulder and inclined at an angle toward the floor.

3 Claims, 14 Drawing Figures

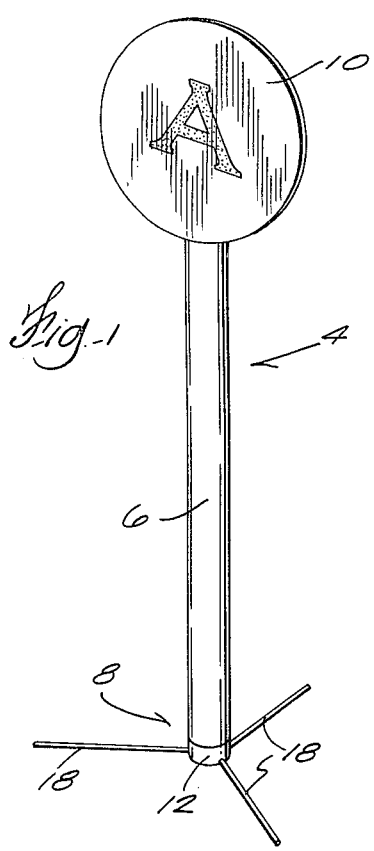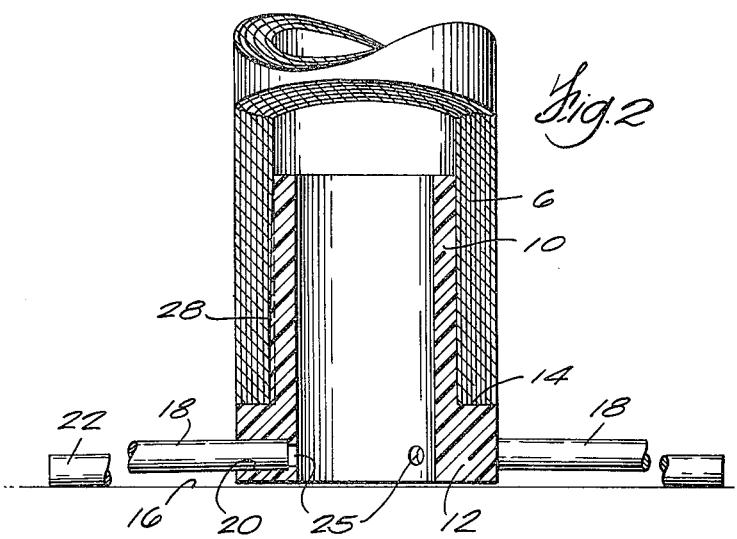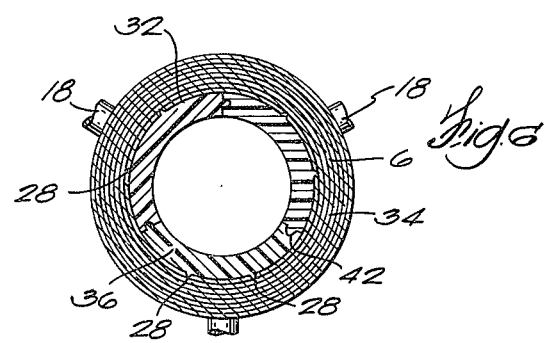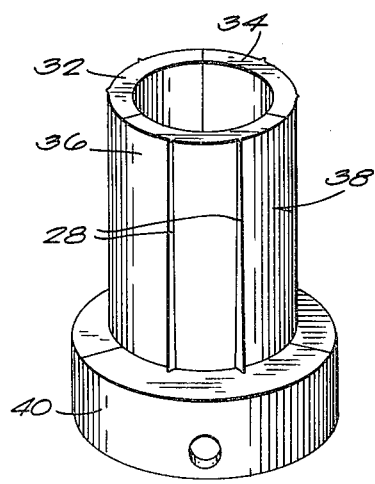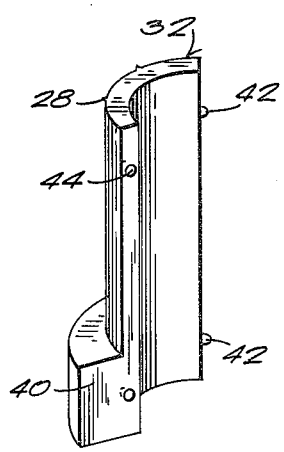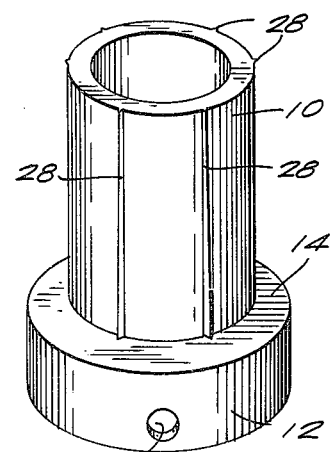

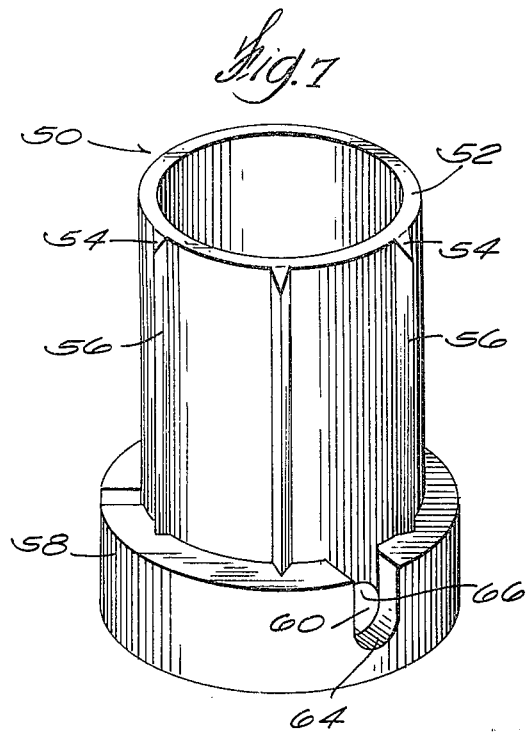
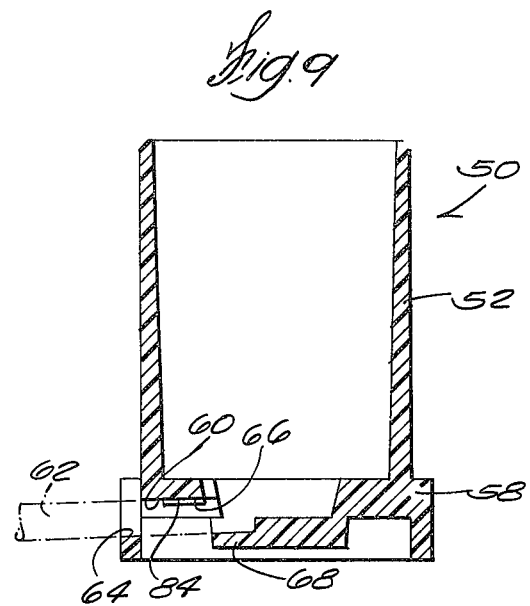
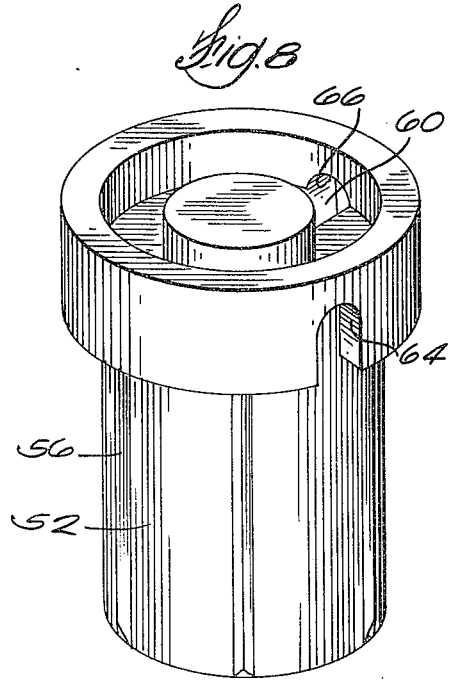
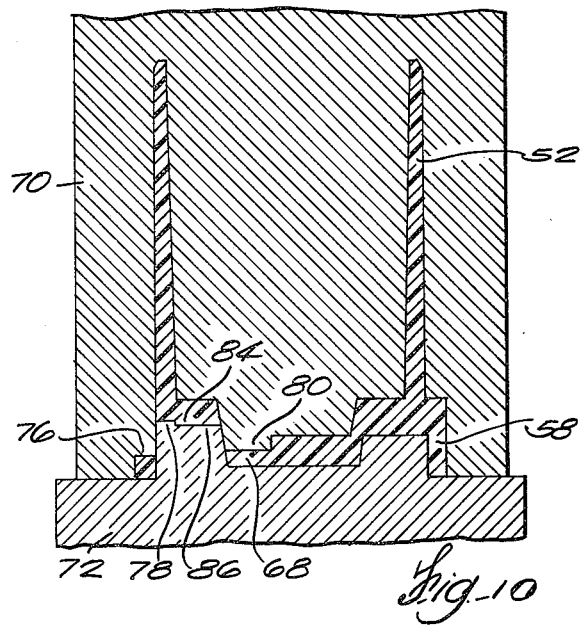
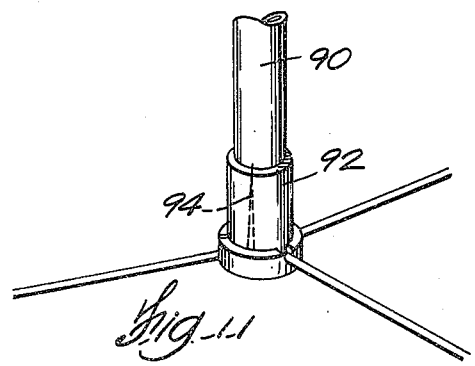

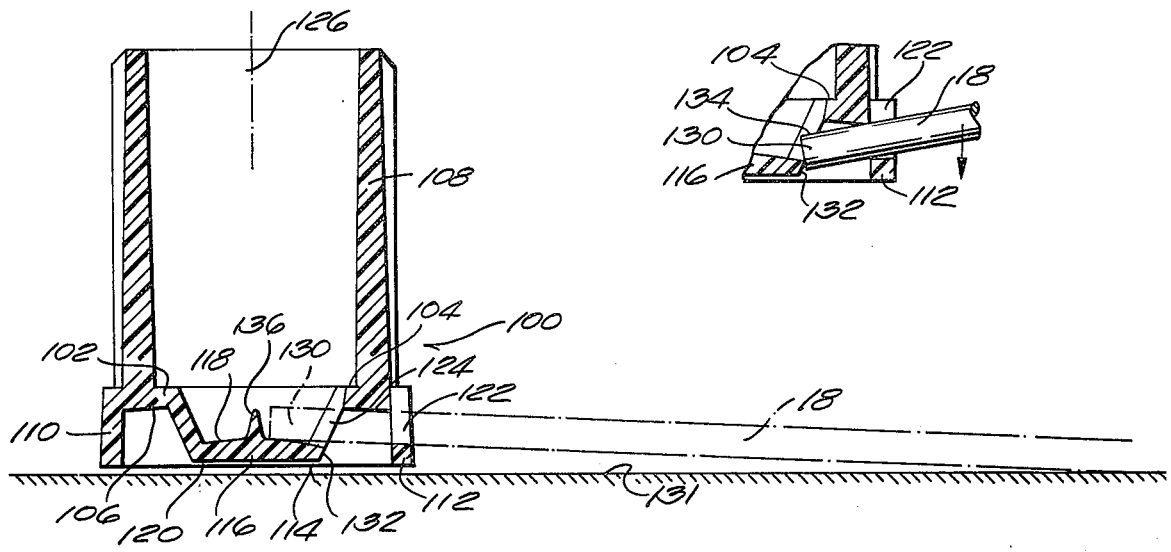
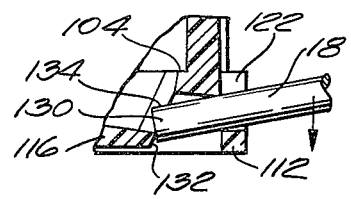
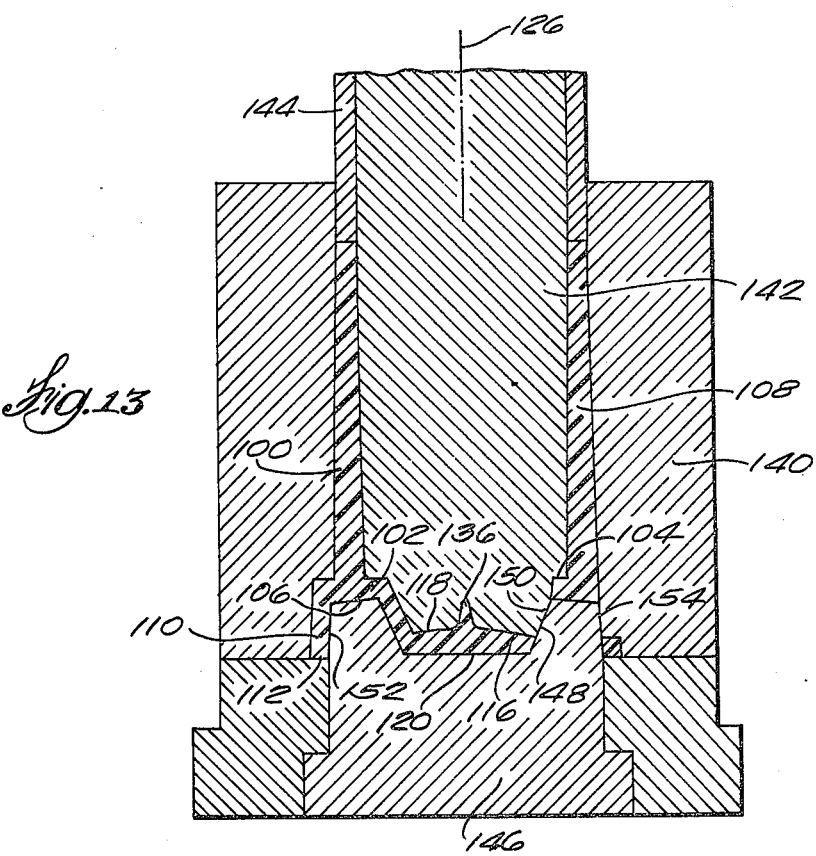

STANDARD FOR A SIGN

CROSS REFERENCE TO RELATED APPLICATION

This application is a continuation-in-part application of application Ser. No. 351,899 filed Apr. 17, 1973, now abandoned.

BACKGROUND OF INVENTION

The various standards available for temporary usage in point of purchase signs or displays are unsatisfactory and generally unstable. For example, typical constructions employ two pieces of wire arranged at 90° with upstanding loops which are inserted in the end of a tubular post. Thus four legs are provided.

SUMMARY OF INVENTION

In accordance with the present invention, a standard is provided with a base having three radially extending legs at an angle with respect to the horizontal to support the bottom of the base above the supporting surface. Longitudinal ribs on the hub or barrel securely retain the tubular post. The shoulder provides a seat for the post. The base may be composed of three parts, each having an equal angular extent and provided with locating pegs and apertures and retained in assembly when surrounded by the post. Alternatively the base can be molded in one piece with a two-part mold, with the leg openings also formed by the mold. The base of the invention reduces the cost of the wire for prior art devices and thus reduces cost and shipping weight.

A frusto-conical projection concentric with the barrel and at the lower end thereof has slots for receiving the legs and an upwardly convex inner end wall surface which provides a cam action as the legs are inserted in the slots to press the legs into firm engagement with the slot walls. Thus fasteners are not required to secure the legs to the base.

Further objects, advantages and features of the invention will become apparent from the following disclosure.

DESCRIPTION OF DRAWINGS

FIG. 1 is a view in perspective of a standard embodying the invention.

FIG. 2 is an enlarged fragmentary sectional view of the base.

FIG. 3 is an enlarged perspective view of the base shown in FIG. 1.

FIG. 4 is an enlarged perspective view of a base of a modified embodiment of the invention.

FIG. 5 is a perspective view of one of the base parts shown in FIG. 4.

FIG. 6 is a cross sectional view of the base shown in FIG. 4 with the base parts surrounded by a post.

FIG. 7 is a perspective view of a modified embodiment of the invention.

FIG. 8 is an inverted perspective view of the standard shown in FIG. 7.

FIG. 9 is a sectional view along line 9—9 of FIG. 7.

FIG. 10 is a sectional view of a standard similar to FIG. 9 and showing the mold parts used to form the standard.

FIG. 11 is a perspective view of a modified embodiment of a standard in which the post is located inside the standard barrel.

FIG. 12 is a sectional view of a modified embodiment of the invention.

FIG. 13 is a sectional view of the embodiment shown in FIG. 12 with mold parts used to form the base shown in section.

FIG. 14 is a fragmentary sectional view similar to FIG. 13 showing a leg being inserted in the base.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A standard 4 in accordance with the invention includes a post 6 which is supported in an erect position on a base 8, hereinafter described, for the purpose of carrying a sign 10, a point of purchase display, or a wide variety of other devices. The post 6 can be constructed of any suitable material. In FIG. 2, the post is a paperboard tube.

The base 8 as shown in FIGS. 1, 2 and 3 includes a cylindrical hub 10 which extends from an annular shoulder 12, which has a larger diameter than the hub 10 and provides a seat 14 for the post 6 when the post 6 is assembled on the hub 10. The base 8 is supported above the ground, floor or other supporting surface 16 by a plurality of spaced supporting legs 18 which interfit in circumferentially arranged radial apertures 20 in the shoulder 12. The apertures 20 are at a slight angle of perhaps 1–3° with respect to the horizontal surface 16 so that the outer ends 22 of the legs contact the ground 16 to provide a tripodal support of the base 8 above the floor or ground 16. The base can be provided with apertures 25 which communicate with the interior 26 of the base to relieve pressure when the legs 18 are inserted.

As best shown in FIG. 3, the hub 10 is provided with longitudinally extending ribs 28 to provide a secure fit of the hub in the post 6 to securely hold the post 6 to the hub 10. The ribs cause a slight expansion or deformation of the cardboard sleeve to facilitate insertion of the hub or barrel 10.

FIGS. 4, 5, and 6 disclose a modified embodiment of the invention in which the base 30 is formed from three base parts or segments 32, 34, 36 to reduce the cost of the mold if the base is formed from plastic. Each segment has an angular extent of 120° and includes a hub portion 38 in the form of a circular ring sector and a shoulder portion 40 in the form of a circular ring sector. The individual base parts include locating pins or projections 42 which register in apertures 44 in the adjoining surfaces of the adjacent part. When the post 6 is assembled on the hub formed by the hub portions 38, the individual base parts 32, 34, 36 are secured together.

FIGS. 7, 8, 9 and 10 disclose a further modified embodiment of the invention in which the base 50 is molded in one piece. The base 50 includes a hub or barrel 52 with an access bevel 54 on the ribs 56 to facilitate insertion in a post 6. The shoulder 58 includes three apertures 60 for receiving legs 62 (FIG. 9). Each of the apertures 60 are defined by three concave surfaces 64, 66, 68 which are formed in a mold (FIG. 10). The mold has two parts 70 and 72. The curved aperture wall portion 64 is formed by a curved die portion 76 on die 70. The wall portion 66 is formed by a die portion 78 on die 72. The inner wall portion 68 is formed by a die portion 80 on die 70. Thus the transversely extending apertures 60 are formed by die parts movable axially of the barrel 52.

To rigidly secure the legs 62 in the sockets formed by the three concave surfaces 64, 66, 68, a rib 84 is molded into the bottom of the concave surface 66 of each socket. The rib can be formed by a mold part 86.

FIG. 11 shows a further modified embodiment in which the post 90 is received internally of the barrel 92. Interior ribs 94 can be employed to provide a good fit with the post 90.

FIGS. 12 and 13 disclose a further modified embodiment of the invention in which the base 100 includes a top wall 102 with an upper surface 104 and a lower surface 106, and a hub or barrel 108 which extends from the top wall. The base also includes a depending annular wall 110 with a lower edge 112.

The base 100 also has a frusto-conical projection 114 which terminates in an end wall 116 which has an upwardly convex surface 118 and a lower surface 120 which is located above the lower edge 112.

The legs 18 are received in slots 122 in the annular wall 110 and slots 124 in the frusto-conical projection 114. The surface 106 is at an angle with respect to the axis 126 greater than 90° to provide a similar angle to the supporting legs to maintain the base in an elevated position above the supporting surface 131.

The frusto-conical projection disposes the entrance to slot 124 at an angle with axis 126 rather than parallel. This greatly facilitates insertion of the legs 18. As shown in FIG. 14, the end 130 of the rod is inserted in the slot 122 until it engages the surface 132 of the projection 114. The leg is then swung in an arc so that a portion 134 of the periphery of the leg less than the full diameter serves as a leader to register the leg 18 in the slot 124. Once the end 130 is registered, the leg 18 is pushed in until the leg engages a locating peg 136 on surface 118. The peg 136 is on the axis 126 and locates the legs so that each leg extends the same distance from the base.

FIG. 13 shows mold parts utilized to make the embodiment shown in FIG. 12. The mold can include an outer mold 140 and an inner mold 142, upper mold 144 and lower mold 146. The molds 142 and 146 are movable along the axis 126 for assembly and withdrawal. Mold 146 has an inclined surface 148 transverse to axis 126 which contacts a transverse surface 150 when the mold is assembled. The surfaces 148 and 150 thus form a slot 124. The surface 152 contacts the surface 154 to form the slot 122. Thus two axially movable die ports are used to form radially aligned apertures.

What is claimed is:

1. A standard for a sign comprising a plurality of support legs and a base having a lower edge and a top wall with upper and lower surfaces and an annular wall with inner and outer spaced surfaces and including a barrel extending from said base top wall and first and second groups of slots in said standard for receiving said supporting legs, said slots in said first group being defined by wall portions in said annular wall open to the lower surface of said top wall, said base including a downwardly tapered frusto-conical shaped projection, said projection having an outer projection surface spaced from said annular wall inner surface and wherein said second group of slots is defined by wall portions in said projection in radial alignment with said slots in said annular wall, and wherein said projection has an end wall having an upwardly convex inner surface engageable with the inner ends of said legs to cam said legs into engagement with said lower surface of said top wall and said lower surface to said first slots upon insertion of the legs in the slots to secure said legs in said base.

2. A standard in accordance with claim 1 wherein said projection is defined by said outer projection surface and an inner surface spaced from said outer surface to form a cavity and locating means on said upwardly convex inner surface, said locating means being engageable with the inner ends of said legs to position said rods with a common length of extension from said base.

3. A standard in accordance with claim 2 wherein said locating means comprises an upstanding peg centered on the longitudinal axis of said standard.

* * * * *